UNITED STATES PATENT OFFICE.

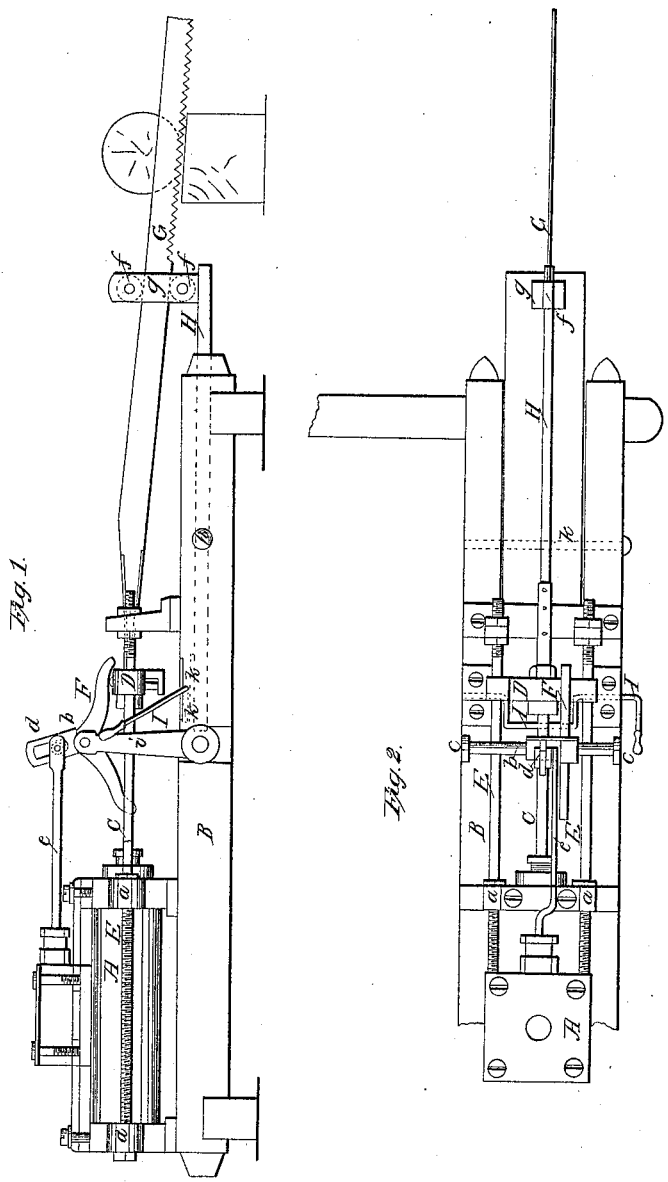

P. B. PERKINS, OF ALMOND, NEW YORK.

IMPROVEMENT IN SAWING-MACHINES.

Specification forming part of Letters Patent No. 43,704, dated August 2, 1864.

*To all whom it may concern:*

Be it known that I, P. B. PERKINS, of Almond, in the county of Allegany and State of New York, have invented a new and Improved Sawing-Machine; and I do hereby declare that the following is a full, clear, and exact description thereof, which will enable others skilled in the art to make and use the same, reference being had to the accompanying drawings, forming part of this specification, in which—

Figure 1 represents a side elevation of my invention. Fig. 2 is a plan or top view of the same.

Similar letters of reference indicate like parts.

This invention consists in a reciprocating saw hinged directly to the driving power and guided by rollers secured in a standard which rises from a tilting adjustable platform in such a manner that by the action of a double-crank hand-lever on the platform the saw can be raised or lowered without stopping the engine, and the power with which the saw bears upon the log can be regulated at pleasure, and by dropping the hand-lever into notches in the inner end of the tilting platform, the outer end of the same, together with the saw, are held in an elevated position, thus giving a chance to the operator to shift his log or perform any work of a similar nature without stopping the engine or paying any attention to the saw.

G is the saw, the shank of which is hinged to the cross-head D, so that it can swing easily up and down in a vertical plane, but is compelled to move with said cross-head in a longitudinal direction. The shank of the saw is guided by rollers the axles of which have their bearings in a standard, $g$, which rises from a platform, H. This platform oscillates on a pin $h$, which passes through the frame B, and through the platform at about the middle of its length, and it is so balanced that its outer end with the standard $g$ has a tendency to descend.

The inner end of the platform is provided with notches or nicks $k$, and a double-crank lever, I, is arranged in such relation to said platform and to the nicks that by throwing the same in the direction of the arrow marked near it in Fig. 1 the rear end of the platform is depressed and the saw is raised, and if the crank part of the lever catches in one of the nicks the saw is held in an elevated position.

In order to adjust a log under the saw the lever is turned back, so that it enters one of the nicks (the first if this will raise the saw high enough, or the second if the log is very thick and the saw is not raised high enough by the first,) and the operator is at liberty to move the log without paying any further attention to the saw or stopping the engine.

When the log is adjusted, the saw is lowered and the operation of sawing commences. If the saw should bear down too hard upon the log, the hand-lever is slightly pressed back, and if the saw should not press down hard enough the pressure can be increased by hanging a weight to the front end of the platform.

With this machine the operation of sawing can be performed in the easiest possible manner. The saw can be operated without interfering with the motion of the engine, and all parts are so arranged that they will operate without much (if any) attention.

Having thus described my invention, I claim as new and desire to secure by Letters Patent—

The tilting platform H, with nicks $h$, in combination with the double-crank hand-lever I and saw G, all constructed and operating in the manner and for the purpose substantially as herein shown and described.

P. B. PERKINS.

Witnesses:
 WESLEY BROWN,
 WM. T. HOWELL,
 WALTER SLINGERLAND,
 WASHINGTON SLINGERLAND,
 I. L. COREY.